United States Patent
Surace et al.

(10) Patent No.: US 12,479,773 B2
(45) Date of Patent: Nov. 25, 2025

(54) CERAMIC MATRIX COMPOSITE PART RELEASE FROM CHEMICAL VAPOR INFILTRATION TOOLING

(71) Applicant: Raytheon Technologies Corporation, Farmington, CT (US)

(72) Inventors: Raymond Surace, Newington, CT (US); Brendan Lenz, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 706 days.

(21) Appl. No.: 17/957,605

(22) Filed: Sep. 30, 2022

(65) Prior Publication Data

US 2024/0109814 A1 Apr. 4, 2024

(51) Int. Cl.
  *C04B 35/622* (2006.01)
(52) U.S. Cl.
  CPC .......... *C04B 35/62281* (2013.01); *C04B 2235/5244* (2013.01); *C04B 2235/614* (2013.01)
(58) Field of Classification Search
  None
  See application file for complete search history.

(56) References Cited

U.S. PATENT DOCUMENTS

| | | | | |
|---|---|---|---|---|
| 4,371,329 A | * | 2/1983 | Steels | A23G 3/0284 425/437 |
| 5,728,333 A | * | 3/1998 | Tabata | B29C 33/46 264/46.4 |
| 9,523,149 B2 | | 12/2016 | Lazur et al. | |
| 9,908,305 B2 | | 3/2018 | Chamberlain et al. | |
| 2016/0271839 A1 | | 9/2016 | Roche et al. | |
| 2021/0147302 A1 | | 5/2021 | Bortoluzzi et al. | |
| 2024/0157434 A1 | * | 5/2024 | Kimura | B22D 17/22 |

FOREIGN PATENT DOCUMENTS

| | | | |
|---|---|---|---|
| CN | 107962792 A | 4/2018 | |
| EP | 3554813 B1 | 1/2022 | |
| WO | WO-2018108967 A1 * | 6/2018 | B29C 33/46 |

OTHER PUBLICATIONS

Extended European Search Report for EP Application No. 23199554. 9, dated Feb. 27, 2024, 7 pages.

* cited by examiner

*Primary Examiner* — Xiao S Zhao
*Assistant Examiner* — Nicholas J Chidiac
(74) *Attorney, Agent, or Firm* — Kinney & Lange, P.A.

(57) ABSTRACT

An assembly for use in releasing a preform from a tooling fixture comprises a solid body engageable with the fixture via a seal, a manifold formed in the solid body and in flow communication with the preform via a plurality of holes in the tooling fixture, and a fluid source in flow communication with the manifold and configured to supply fluid to the manifold. The fluid comprises at least one of a gas and a slurry.

14 Claims, 3 Drawing Sheets

CERAMIC MATRIX COMPOSITE PART RELEASE FROM CHEMICAL VAPOR INFILTRATION TOOLING

BACKGROUND

The present invention relates to chemical vapor infiltration (CVI), and more particularly to improved tooling for CVI.

In forming a ceramic matrix composite (CMC) part, a ceramic fiber preform can be placed in outer-mold-line (OML) tooling for application of fiber interface coating(s) (IFC) and matrix. Such tooling can be machined from high-purity graphite and include an array of infiltration holes through which the vaporous precursors of the IFC and matrix can pass to reach the preform. Partially densified preforms can sometimes stick/adhere to the OML tooling and/or "pillow" into the infiltration holes. Complexly shaped preforms and/or those with a large surface area in communication with the OML tooling can be particularly vulnerable to sticking. Having to pull on or pry adhered portions of the preform can cause damage such as delamination of surface plies. One current mitigation technique is to coat the OML tooling with silicon carbide (SiC), but this coating does not prevent all sticking and does little to mitigate pillowing. Thus, alternative means for releasing preforms from tooling are desirable.

SUMMARY

An assembly for use in releasing a preform from a tooling fixture comprises a solid body engageable with the fixture via a seal, a manifold formed in the solid body and in flow communication with the preform via a plurality of holes in the tooling fixture, and a fluid source in flow communication with the manifold and configured to supply fluid to the manifold. The fluid comprises at least one of a gas and a slurry.

A method of releasing a preform from a tooling fixture comprises engaging a manifold assembly with the tooling fixture, the manifold assembly comprising, a solid body with a manifold formed therein, and a seal. The method further comprises securing the preform with at least one clamp, aligning the manifold with at least a subset of holes of a plurality of holes in the tooling fixture, and supplying a flow of fluid to the manifold such that the fluid traverses the subset of holes to exert a force on the preform.

An assembly for use in releasing a preform from a tooling fixture comprises a solid body engageable with the fixture via a seal, a manifold formed in the solid body and in flow communication with the preform via a plurality of holes in the tooling fixture, a comb positioned in at least a subset of the plurality of holes in the tooling fixture, and a fluid source in flow communication with the manifold and configured to supply fluid to the manifold. The fluid comprises at least one of a gas and a slurry.

Figure 1:
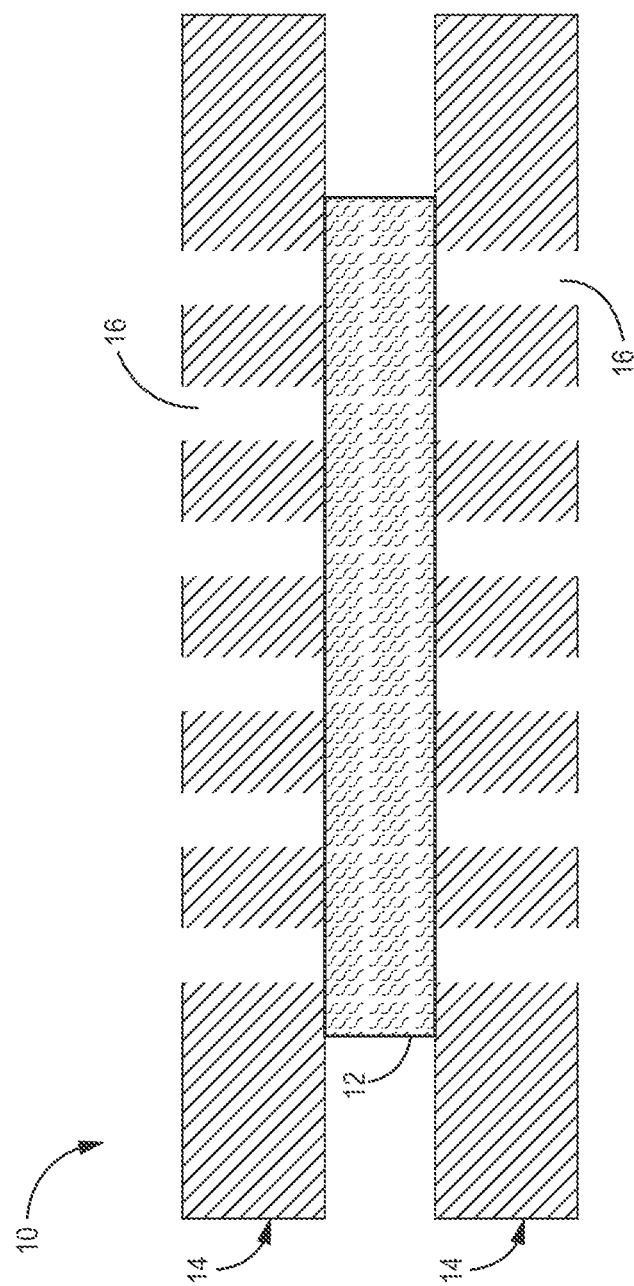
FIG. 1 is a simplified cross-sectional illustration of a preform mounted in a tooling assembly.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various means for controllably releasing a partially densified preform from OML tooling. More specifically, a section of OML tooling with preform can be placed in flow communication with a manifold, and a controlled flow of fluid can be passed through the manifold and subsequently through the holes within the tooling to exert a force on the preform. The fluid can be a gas or a high-viscosity slurry. Such fluid based release means can be used to prevent the type and/or extent of damage to a preform that can be caused by traditional manual removal means.

FIG. 1 is a simplified cross-sectional view of tooling assembly 10 with fibrous preform 12 mounted therein. In the embodiment shown in FIG. 1, tooling assembly 10 can include multiple fixtures. In the embodiment shown, fixtures can be plates 14 having infiltration holes 16 extending therethrough. Plates 14 can be formed from graphite in an exemplary embodiment. Portions of plates 14 can additionally and/or alternatively be formed from non-graphitic forms of carbon and/or ceramics (e.g., SiC). Such features can, for example, include locating pins. Preform 12 can be formed plies comprised of woven or braided tows of silicon carbide (SiC) fibers arranged in one of various woven architectures such as plain, harness (e.g., 3, 5, 8, etc.), twill, braid, or non-symmetric to name a few non-limiting examples. Although shown as generally flat, preform 12 and plates 14 can, in other embodiments, be curved, such as with an airfoil-shaped preform and fixtures conforming to the pressure and suction sides of such a preform.

Figure 2:
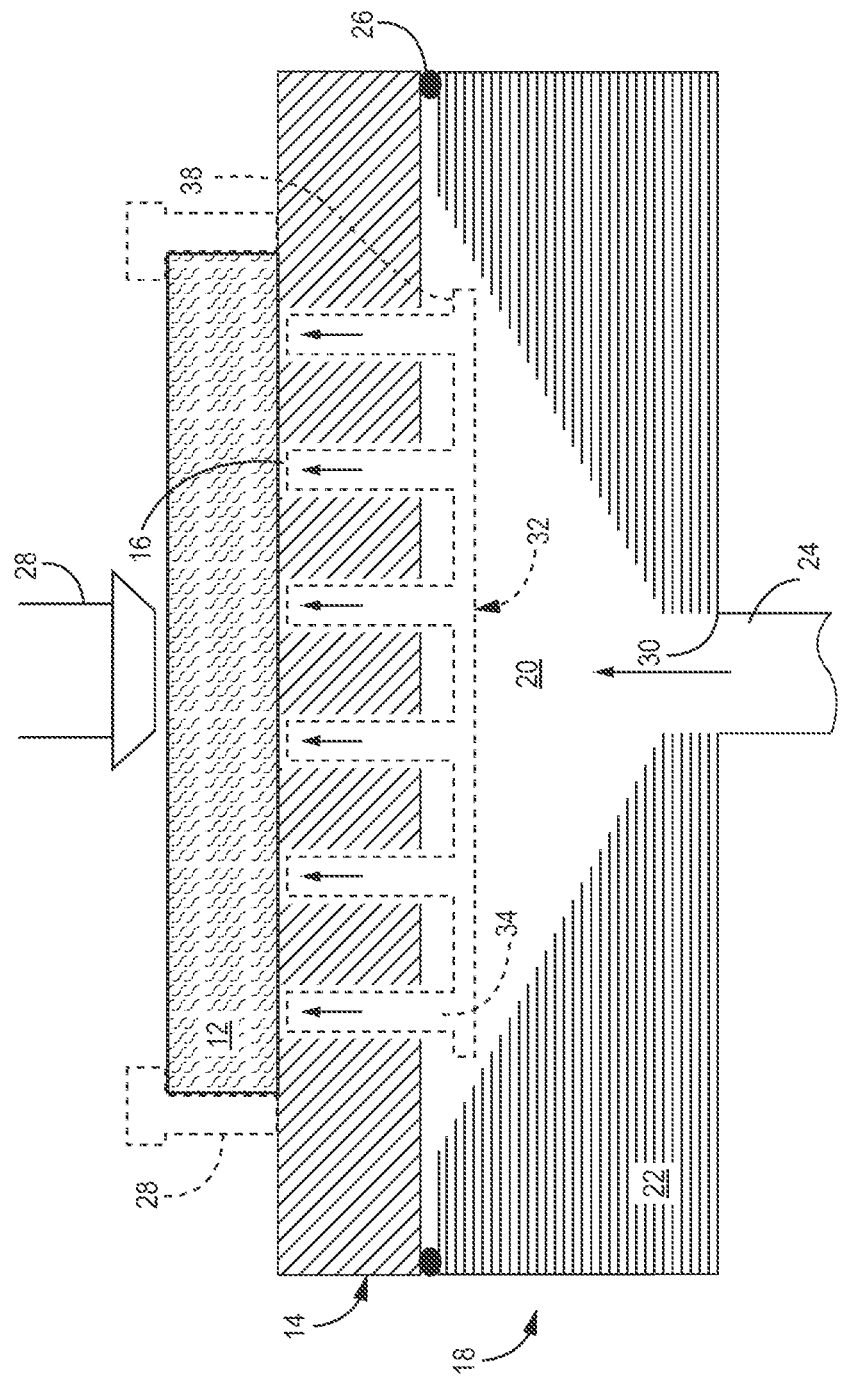
FIG. 2 is a simplified cross-sectional illustration of the tooling assembly mounted on a manifold assembly.

FIG. 2 is a simplified cross-sectional view of plate 14 with preform 12 positioned atop manifold assembly 18. Manifold assembly 18 can include manifold 20 formed within body 22, and source 24 of fluid (e.g., a gas or slurry), as is discussed in greater detail below. Body 22 and/or manifold 20 can be curved in an alternative embodiment, specifically for use with curved tooling assemblies 10 and preforms 12. O-ring 26 or other type of sealing element can be included to form a seal between manifold assembly 18 and plate 14. Non-marring clamp 28 can be used to prevent preform 12 from unexpectedly and/or forcefully being ejected from plate 14 during the part release process, by opposing the force of the fluid or slurry on preform 12. Accordingly, non-marring clamp 28 can have a rubbery contact surface and can further be gapped a slight distance from preform 12 to allow some movement. Alternatively, a spring-loaded/damped non-marring clamp 28 can be used to permit some movement of both preform 12 and clamp 28. In an alternative embodiment, one or more non-marring clamps 28 can additionally and/or alternatively be disposed around the periphery of preform 12, as shown in dashed lines in FIG. 2.

To release preform 12, fluid from source 24 can be introduced to manifold 20 at manifold inlet 30. The fluid flows through manifold 20 toward plate 14, then through holes 16 in plate 14 toward preform 12, as indicated by arrows. The fluid exerts a controlled force across the area of preform 12 in communication with holes 16, facilitating its release from plate 14. In one embodiment, the fluid can be air from a source (e.g., source 24) of dry compressed air, fed into manifold 20 through a hose or tube. In an alternative embodiment, the fluid can be a relatively high-viscosity slurry, for example, a polymeric putty. Slurry can be introduced to and traverse manifold 20 in the same manner as compressed air, exerting a force on preform 12 via holes 16. The use of a slurry versus air can depend, for example, on the porosity of preform 12. More specifically, slurry may be preferable with higher porosity performs to ensure that fluid does not penetrate preform 12. In an alternative embodiment, air and slurry can be used in tandem to facilitate the release of preform 12. In such an embodiment, slurry can be manually introduced into holes 16 to at least partially fill holes 16. Air can subsequently be applied to the slurry-filled holes via manifold 20.

Comb 32, shown in dashed lines, can optionally be aligned with and at least partially inserted into holes 16 prior to introducing fluid (i.e., air or slurry) into manifold 20. Comb 32 can facilitate even distribution of pressure across preform 12 as the fluid forces comb 32 upward to urge against preform 12. Comb 32 can be linear, with a single row of teeth 34, or an array (i.e., two or more rows) of teeth 34, and can further be additively manufactured to match up with holes 16 of a particular plate 14. Teeth 34 can be long enough to contact or penetrate preform 12 when upwardly displaced by the fluid. Comb 32 can further include overhanging edges 38 that can engage/form a seal with plate 14 when upwardly displaced by the fluid. In some embodiments, additional sealing features can be included such as a rubber gasket, spring loaded seal, and/or vacuum grease applied to teeth 34.

Figure 3:
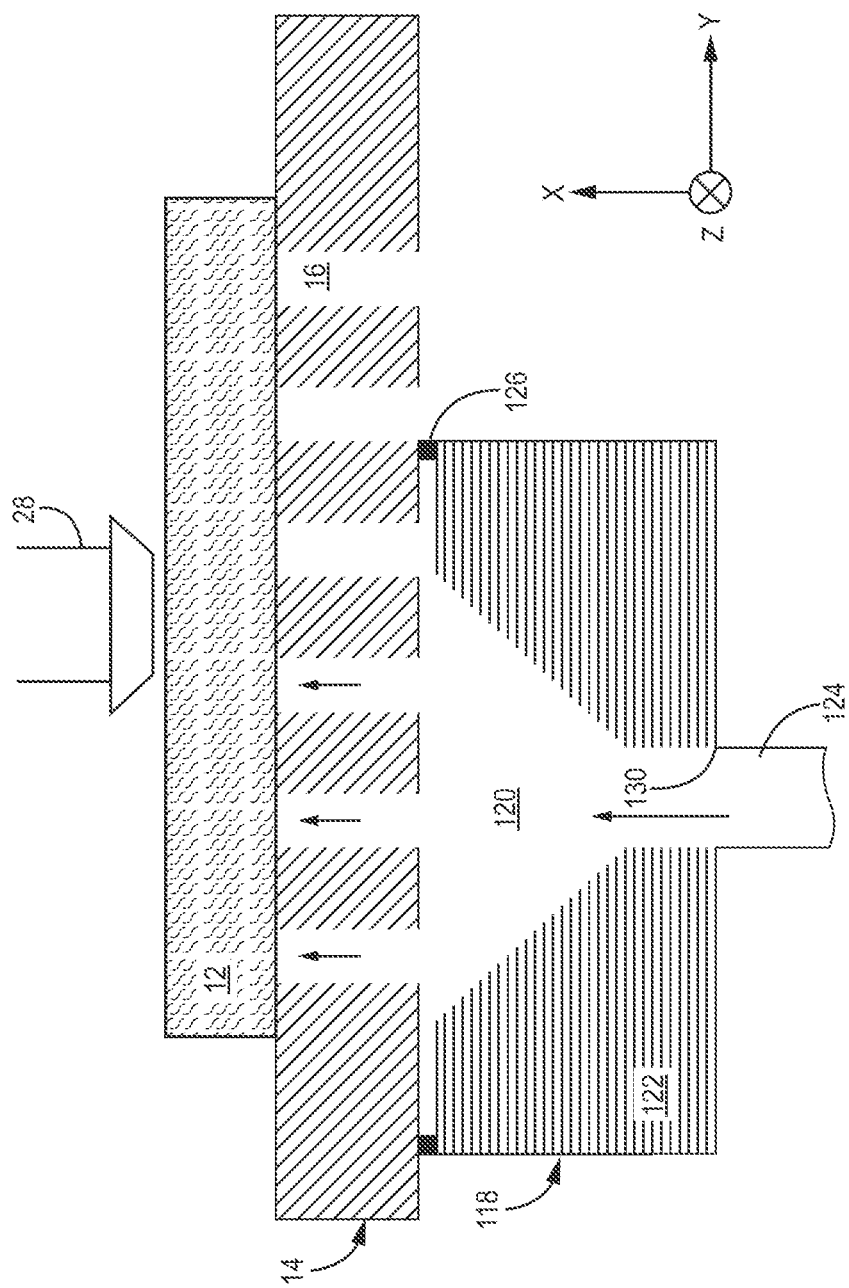
FIG. 3 is a simplified cross-sectional illustration of an alternative manifold assembly.

FIG. 3 is a simplified cross-section illustration of an alternative manifold assembly 118 for releasing preform 12 from plate 14. Manifold assembly 118 is similar to manifold assembly 18 in that it includes manifold 120 formed into body 122, and source 124 of a fluid (i.e., air or slurry) that can be introduced into manifold 120 via inlet 130. Unlike manifold assembly 18, manifold assembly 118 is configured to move relative to plate 14, and is therefore a translating manifold assembly 118. More specifically, manifold assembly 118 can move along the area of plate 14, along the y-axis, the z-axis, or in the area therebetween. For more complexly shaped (e.g., curved) preforms 12 and/or tooling assemblies 10, manifold assembly 118 can move along any of the x, y, and/or z-axes Seals 126 can be included to form a seal between manifold 120 and plate 14, and can further be spring-loaded and/or have a non-stick (e.g., Teflon) contact surface with plate 14 to facilitate sliding along plate 14 while maintaining a seal. Manifold assembly 118 can otherwise operate similarly to manifold assembly 18, flowing air or slurry against plate 14 and preform 12. Movement of manifold assembly 118 can occur either simultaneously or sequentially with the flow of fluid into manifold 120. Although not shown in FIG. 3, peripheral non-marring clamps 28 and/or comb 32 can also be used with manifold assembly 118.

The disclosed manifold assemblies can be used in the formation of CMC components suitable for use in aerospace, maritime, or industrial equipment, to name a few, non-limiting examples.

DISCUSSION OF POSSIBLE EMBODIMENTS

The following are non-exclusive descriptions of possible embodiments of the present invention.

An assembly for use in releasing a preform from a tooling fixture comprises a solid body engageable with the fixture via a seal, a manifold formed in the solid body and in flow communication with the preform via a plurality of holes in the tooling fixture, and a fluid source in flow communication with the manifold and configured to supply fluid to the manifold. The fluid comprises at least one of a gas and a slurry.

The assembly of the preceding paragraph can optionally include, additionally and/or alternatively, any one or more of the following features, configurations and/or additional components:

The above assembly can further include at least one clamp securing the preform to the fixture.

Any of the above assemblies can further include a comb positioned in at least a subset of the plurality of holes in the tooling fixture.

In any of the above assemblies, the seal can be an o-ring.

In any of the above assemblies, the solid body and the manifold can be translatable along a surface of the tooling fixture.

In any of the above assemblies, the seal can be spring-loaded.

In any of the above assemblies, the gas can be air.

In any of the above assemblies, the slurry can be a polymeric putty.

A method of releasing a preform from a tooling fixture comprises engaging a manifold assembly with the tooling fixture, the manifold assembly comprising, a solid body with a manifold formed therein, and a seal. The method further comprises securing the preform with at least one clamp, aligning the manifold with at least a subset of holes of a plurality of holes in the tooling fixture, and supplying a flow of fluid to the manifold such that the fluid traverses the subset of holes to exert a force on the preform.

The method of the preceding paragraph can optionally include, additionally and/or alternatively, any one or more of the following features, configurations and/or additional components:

In the above method, the fluid can be air.

In any of the above methods, the fluid can be a polymeric putty.

Any of the above methods can further include prior to supplying the flow of fluid to the manifold, positioning a comb against the tooling fixture such that teeth of the comb align with holes of the tooling fixture.

Any of the above methods can further include supplying the flow of fluid to the manifold such that the fluid displaces the comb toward the preform such that the teeth physically contact the preform.

Any of the above methods can further include moving the manifold assembly along the tooling fixture.

In any of the above methods, the tooling fixture can be formed from graphite.

In any of the above methods, the preform can be formed from silicon carbide fibers.

An assembly for use in releasing a preform from a tooling fixture comprises a solid body engageable with the fixture via a seal, a manifold formed in the solid body and in flow communication with the preform via a plurality of holes in the tooling fixture, a comb positioned in at least a subset of the plurality of holes in the tooling fixture, and a fluid source in flow communication with the manifold and configured to supply fluid to the manifold. The fluid comprises at least one of a gas and a slurry.

The assembly of the preceding paragraph can optionally include, additionally and/or alternatively, any one or more of the following features, configurations and/or additional components:

In the above assembly, the comb can include a plurality of teeth and two overhanging edges engageable with the tooling fixture.

In the above assembly, the gas can be air.

In the above assembly, the slurry can be a polymeric putty.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for use in releasing a preform from a tooling fixture, the assembly comprising: a solid body engageable with the fixture via a seal; a manifold formed in the solid body, the manifold in flow communication with the preform via a plurality of holes in the tooling fixture; a comb positioned in at least a subset of the plurality of holes in the tooling fixture; and a fluid source in flow communication with the manifold and configured to supply fluid to the manifold; wherein the fluid comprises at least one of a gas and a slurry.

2. The assembly of claim 1 and further comprising: at least one clamp securing the preform to the fixture.

3. The assembly of claim 1, wherein the seal is an o-ring.

4. The assembly of claim 1, wherein the gas is air.

5. The assembly of claim 1, wherein the slurry is a polymeric putty.

6. The assembly of claim 1, wherein the solid body and the manifold are translatable along a surface of the tooling fixture.

7. The assembly of claim 6, wherein the seal is spring-loaded.

8. A method of releasing a preform from a tooling fixture, the method comprising: engaging a manifold assembly with the tooling fixture, the manifold assembly comprising: a solid body with a manifold formed therein; and a seal; securing the preform with at least one clamp; aligning the manifold with at least a subset of holes of a plurality of holes in the tooling fixture; and supplying a flow of fluid to the manifold such that the fluid traverses the subset of holes to exert a force on the preform; wherein prior to supplying the flow of fluid to the manifold, positioning a comb against the tooling fixture such that teeth of the comb align with holes of the tooling fixture.

9. The method of claim 8, wherein the fluid is air.

10. The method of claim 8, wherein the fluid is a polymeric putty.

11. The method of claim 8 and further comprising: supplying the flow of fluid to the manifold such that the fluid displaces the comb toward the preform such that the teeth physically contact the preform.

12. The method of claim 8 and further comprising: moving the manifold assembly along the tooling fixture.

13. The method of claim 8, wherein the tooling fixture is formed from graphite.

14. The method of claim 8, wherein the preform is formed from silicon carbide fibers.

* * * * *